Figure 1:
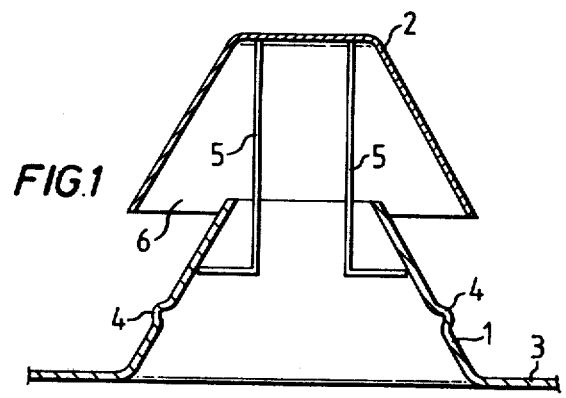

United States Patent [19]

Thomas

[11] 4,382,901
[45] May 10, 1983

[54] MASS TRANSFER EQUIPMENT
[75] Inventor: Mark E. Thomas, Ashford, England
[73] Assignee: The British Petroleum Company Limited, London, England
[21] Appl. No.: 404,065
[22] Filed: Aug. 2, 1982

Related U.S. Application Data

[63] Continuation of Ser. No. 244,307, Mar. 16, 1981, abandoned, which is a continuation of Ser. No. 76,390, Sep. 17, 1979, abandoned.

[30] Foreign Application Priority Data

Oct. 5, 1978 [GB] United Kingdom ............ 39571/78

[51] Int. Cl.³ .............................................. B01F 3/04
[52] U.S. Cl. ..................... 261/114 A; 261/114 VT; 137/512.1; 137/533.17
[58] Field of Search ............... 261/114 VT, 114 A; 137/533.17, 512.1

[56]  References Cited
U.S. PATENT DOCUMENTS

| 1,605,264 | 11/1926 | Millard | 261/114 A |
| 1,629,961 | 5/1927 | Nicholson | 137/533.17 |
| 1,808,276 | 6/1931 | Widdell | 261/114 VT |
| 2,205,284 | 6/1940 | Eckart | 261/114 |
| 2,982,527 | 5/1961 | Eld et al. | 261/114 VT |
| 3,025,041 | 3/1962 | Sandler | 261/114 |
| 3,215,414 | 11/1965 | Van't Sant | 261/114 |
| 3,513,485 | 5/1970 | Davila | 3/1 |
| 3,530,879 | 9/1970 | Nutter | 137/512.1 |
| 4,185,655 | 1/1980 | Wilkes et al. | 137/315 |

FOREIGN PATENT DOCUMENTS

| 160501 | 10/1953 | Australia | 261/114 A |
| 12289 | 6/1903 | Austria | 261/114 A |
| 46230 | 4/1936 | France | 261/114 A |
| 776130 | 6/1957 | United Kingdom | 261/114 A |
| 1048223 | 11/1966 | United Kingdom | 261/114 VT |

Primary Examiner—Tim R. Miles
Attorney, Agent, or Firm—Morgan, Finnegan, Pine, Foley & Lee

[57] ABSTRACT

Mass transfer equipment comprises a base (3) having at least one riser (1) with inwardly elongated sloping sides and a moveable valve cap (2) positioned above the riser (1), having outwardly and downwardly elongated sloping sides. Legs (5) extend downwardly from the valve cap (2) and posses stops which limit the movement of the valve cap (2) to such an extent that the lower edge of the sloping side of the valve cap (2) is never above the upper edge of the sloping side of the riser (1). Dimples (4) may be provided on the riser (1) to prevent sticking when the valve is closed.

4 Claims, 3 Drawing Figures

MASS TRANSFER EQUIPMENT

CROSS-REFERENCE TO RELATED APPLICATIONS

This is a continuation of application Ser. No. 244,307, filed Mar. 16, 1981, now abandoned, which, in turn, is a continuation of application Ser. No. 76,390, filed Sept. 17, 1979, now abandoned.

This invention relates to mass transfer equipment. Distillation, absorption and extraction are mass transfer operations widely used in the oil refining, chemical and petrochemical industries. The equipment used to enable this mass transfer to take place is a column or tower. In the column, liquids and vapours contact each other and components from one phase can be transferred to the other. The amount of interphase diffusion of the components is increased when the contacting surface area is increased, i.e., the more intimate the phase contact, the higher the mass transfer efficiency.

Columns may be classified under two broad headings—packed and plate-type. Packed columns generally use meshes or rings whereas plate-type columns utilise plates or trays, spaced apart by a predetermined distance, which serve as the phase contacting area. The trays carry the phase contacting devices of which there are three main types, with many variants of each.

Bubble caps and sieves have traditionally been used as vapour/liquid contactors. The bubble cap consists of a riser which acts as a liquid seal and through which the vapour rises. The vapour then proceeds through a reverse path and is dispersed into the liquid via slots in the cap. With a sieve tray, liquid is maintained on the tray surface by the kinetic energy of the vapour. Bubble caps have a limited efficiency and also they are expensive to manufacture. Sieves are largely used because of their simplicity in both manufacture and maintenance. However, they are less efficient than bubble caps.

An alternative to bubble caps and sieves is the valve tray. Most valves consist of an orifice in the tray with a moveable cap valve fitted directly above it, which provides a variable open area. Valves are generally considered to be superior to bubble caps and sieves as they seek to combine the advantages of both. The flexibility of these trays results in a more efficient operation for a wide range of conditions. Valve trays have a pressure drop which lies between that for sieves and bubble caps. In vacuum distillation particularly, pressure drop becomes very important, and should be as low as possible. Nevertheless, reasonable capacity is also required as vapour volumes become very large under these conditions and therefore valves are widely used in this application.

It is usually accepted that one area in which a valve tray is superior to a sieve is the reduction of weeping and dumping, particularly under low vapour loads. Excessive weeping can lead to a severe loss of fractionation efficiency. In sieves, liquid is prevented from weeping through the holes by the velocity of the vapour, provided that this velocity is above a certain minimum value. Weeping will occur if this vapour rate is not achieved. In theory, valves are designed to operate over a much wider range by preventing weeping of liquid through the holes at low vapour velocities. However, in practice, it has been found that serious weeping problems can occur with conventional valves. At low vapour loads, liquid can leak, not only through the valve orifice, but also through the holes on the tray through which the valve cage legs pass. Most of the liquid on the tray can weep through the valve when it is fully opened. However, significant weeping can occur even when the valve is nominally shut because of imperfections of fit or because of dimples on the cap to prevent the cap sticking to the tray.

We have now designed a novel valve which is more efficient in operation than those of the prior art.

Thus according to the present invention there is provided mass transfer equipmemt comprising a base having at least one riser with inwardly and upwardly elongated sloping sides leading to an aperture and a moveable valve cap positioned above the riser on each aperture, the valve cap comprising (a) an upper section adapted to seat over the aperture when the cap is in the closed position, (b) outwardly and downwardly elongated sloping sides adapted to cover the sloping sides of the riser when the valve is in the closed position, and (c) legs extending downwardly from the upper section having stops attached thereto which in use are restrained by the base or the sloping sides of the riser and thus limit the movement of the valve cap to such an extent that the lower edge of the sloping side of the valve cap is never above the upper edge of the sloping side of the riser.

The base may be an independent unit or it may form part of the tray deck.

Preferably the aperture and the upper portion of the valve cap are circular in cross-section and the sloping sides of the riser and the valve cap are in the form of frustra of a cone.

Preferably one or other of the sloping surfaces bears small projections to prevent sticking when it is contacted with the other sloping surface.

Preferably the sloping sides of the riser and valve cap are parallel and inclined to an angle in the range 20° to 60° from the vertical.

Figure 2:
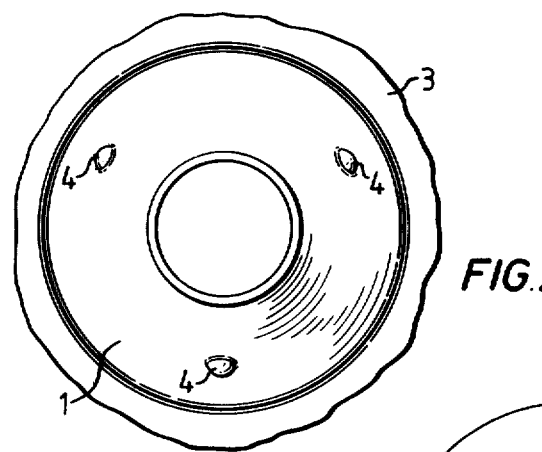
Figure 3:
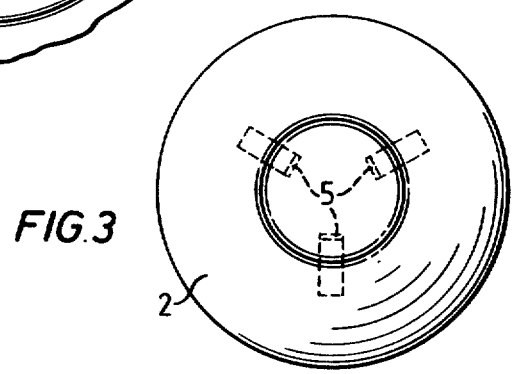

The invention is illustrated with reference to FIGS. 1-3 of the accompanying drawings wherein FIG. 1 is a sectional elevation of a valve assembly with the valve in the fully open position, FIG. 2 is a plan view of the valve riser, and FIG. 3 is a plan view of the valve cap.

The valves employed are about 1½" OD × ¾" high. The construction of a tray is conventional and the units are laid out on a triangular pitch of 3". Each valve contains a two part assembly consisting of an angled riser (1) and an angled orifice cap (2). The sides of each part may be inclined to any angle but the valve shown has sides inclined at 30° to the vertical. The riser also acts as a valve guide. Both risers and orifice caps can be fabricated from carbon or stainless steel and are manufactured simply by punching. The covers can be punched into shape from 15 gauge sheet metal, whilst the risers are punched out of the tray deck (3) itself. Depending on the pressure drop restrictions, various heights of orifice cover and riser can be used and also a lighter valve can be manufactured by using thinner gauge materials.

The valve incorporates dimples (4), punched into the riser which, when the valve is shut, reduce cap/riser contact to spot contact at the dimples and can eliminate cap/tray deck contact completely, hence minimising sticking. Three legs (5) are welded on to the underside of each orifice cover, which is positioned in the riser, and the legs then bent to 90° at the ends so that the cap is retained in the riser. Alternatively the orifice cap with legs can be produced at the punching stage in a similar way to some conventional flat valve caps.

Vapour rises from below the tray and passes up through the angled riser. As the cross-sectional area of the riser reduces, the vapour is accelerated to meet the orifice cover which deflects it through an angle of 90°–180°, (150° in the illustrated case). It then flows into the liquid via the annular gap (6) formed between the orifice cover and the riser. A minimum head of liquid (equal to the riser height) is maintained on the tray. The vapour then meets this liquid where interphase contacting and diffusion can take place. At higher vapour loads, the orifice cover starts to lift and this increases the contact area between vapour and liquid. At any given time the vapour flow should open the valve sufficiently for optimum contacting of vapour and liquid. At low vapour flows the liquid is prevented from dumping back down through the valve because of the riser, which may also serve to reduce weeping to a large extent during normal operation.

The liquid flows across the tray at right angles to the valve rows. Because the valve is symmetrical, vapour can eject into the liquid from all sides of each valve, efficiently breaking up the liquid and ensuring good distribution and mixing of vapour in the liquid. A valve according to the present invention redirects vapour through an angle greater than 90°, unlike conventional valves and it is considered that this leads to a higher point efficiency. Due to the efficiency of liquid mixing on the tray this, in turn, can lead to a higher tray efficiency.

The weeping characteristics of the novel valve of this present invention have been compared with those of typical commercial vapour/liquid contactors. For these determinations, a single contacting device on a tray was evaluated in an atmospheric test unit. Water was passed across the tray at a constant flow rate of 15 liters/hour, whilst air flowed up through the contacting deivce at a rate set in the range 10–70 ft$^3$/hour. The water which had wept through the contactor was collected and measured. The results in the table below show the proportion of the water flowing across the tray which passes through it for different air flowrates. The sieve tray tests, dumped (100% weeping) at all the air flows examined. For the two common commercial valves tested, 100% weeping occurred at the lowest air flow of 10 ft$^3$/hour, but at higher air flows the weeping was reduced. However, the floating bubble cap valve did not weep at all, even at the lowest air flowrate.

| Vapour/Liquid Contactor | | Air Flowrate ft$^3$/h | | | | |
|---|---|---|---|---|---|---|
| | | 70 | 50 | 30 | 20 | 10 |
| | | % of Water Weeping | | | | |
| Sieve | % | 100 | 100 | 100 | 100 | 100 |
| Commercial Valve Cap in Hold Down | % | 35 | 50 | 75 | 85 | 100 |
| Commercial Legged Valve | % | 0 | 6 | 20 | 52 | 100 |
| Floating Bubble Cap Valve | % | 0 | 0 | 0 | 0 | 0 |

I claim:
1. Mass transfer equipment comprising:
 (a) a base having at least one riser with inwardly and upwardly elongated sloping sides leading to an aperture, said riser having a height at least equal to a head of liquid maintained on a tray;
 (b) a valve cap positioned above the aperture on each riser to form a valve therewith, said valve cap comprising:
  (1) an upper section disposed over the aperture, and
  (2) elongated sides sloping outwardly and downwardly therefrom to overlap the sloping sides of the riser, said upper section and said elongated sides co-acting to redirect vapour passing up through the riser downward to eject said vapour through a liquid surrounding the riser at an angle requiring said vapour to redirect itself through an angle of more than 90° to bubble up through said liquid, said riser inhibiting weeping in said valve, said valve cap being moveable relative to said riser to provide a vapour flow passage of variable cross-section disposed therebetween, the cross-section of said vapour flow passage increasing in response to higher vapour loads to provide increased contact area between said vapour and said liquid to maintain operating efficiency; and
 (c) a plurality of legs extending downwardly from said upper section, said legs having stops attached thereto to limit the movement of said valve cap to such an extent that the lower edge of the sloping sides of said valve cap is never above the upper edge of the sloping sides of said riser to maintain said downward ejection of said vapour into said liquid at all flow rates of said vapour; said legs co-acting with said stops to provide a maximum spacing between said riser and said valve cap to set bounds to said variation in said displacement of said valve cap, there being a projection from the elongated sides of either said valve cap or said riser to provide a minimum spacing between said valve cap and said riser to minimize sticking of said valve cap to said tray.

2. Mass transfer equipment according to claim 1 wherein the aperture and upper portion of the valve cap are circular in cross-section and the sloping sides of the riser and the valve cap are in the form of frustra of a cone, causing said valve to be symmetrical so that said vapour is ejected into said liquid from all sides of said valve, thereby causing said vapour to efficiently break up said liquid and ensure good distribution and mixing of said vapour in said liquid.

3. Mass transfer equipment according to claims 1 or 2, wherein the sloping sides of the riser and valve cap are each inclined at an angle in the range of 20° to 60° from the vertical.

4. Mass transfer equipment according to claim 3 wherein the sloping sides of the riser and valve cap are inclined at an angle of 30° from the vertical.

* * * * *